United States Patent [19]

Matsuzaki et al.

[11] Patent Number: 4,698,153
[45] Date of Patent: Oct. 6, 1987

[54] APPARATUS FOR PRODUCING ULTRA-PURE WATER BY ION EXCHANGE RESIN

[75] Inventors: Harumi Matsuzaki, Hitachi; Masayoshi Kubota, Hitachiota; Katsuya Ebara, Moto; Sankichi Takahashi, Hitachi; Minoru Kuroiwa, Abiko, all of Japan

[73] Assignee: Hitachi, Ltd., Tokyo, Japan

[21] Appl. No.: 699,437

[22] Filed: Feb. 7, 1985

[30] Foreign Application Priority Data

Feb. 8, 1984 [JP] Japan .................................. 59-19982

[51] Int. Cl.$^4$ .................................................. C02F 1/42
[52] U.S. Cl. ..................................... 210/192; 210/266; 210/900

[58] Field of Search ............... 210/192, 263, 266, 274, 210/295, 321.1, 900

[56] References Cited

U.S. PATENT DOCUMENTS

| | | | |
|---|---|---|---|
| 3,455,819 | 7/1969 | Crits ..................................... | 210/274 |
| 3,870,033 | 3/1975 | Faylor et al. ....................... | 210/900 |
| 4,061,566 | 12/1977 | Modell ................................. | 210/673 |
| 4,160,727 | 7/1979 | Harris ................................... | 210/900 |

*Primary Examiner*—Ivars Cintins
*Attorney, Agent, or Firm*—Antonelli, Terry & Wands

[57] ABSTRACT

Projections are removed from the surfaces of ion exchange resin particles by contacting the resin particles with a liquefied gas or supercritical gas in advance. The ion exchange resin thus prepared can remove ions from raw water so thoroughly that the water quality can be improved to that of ultra-pure water.

14 Claims, 3 Drawing Figures

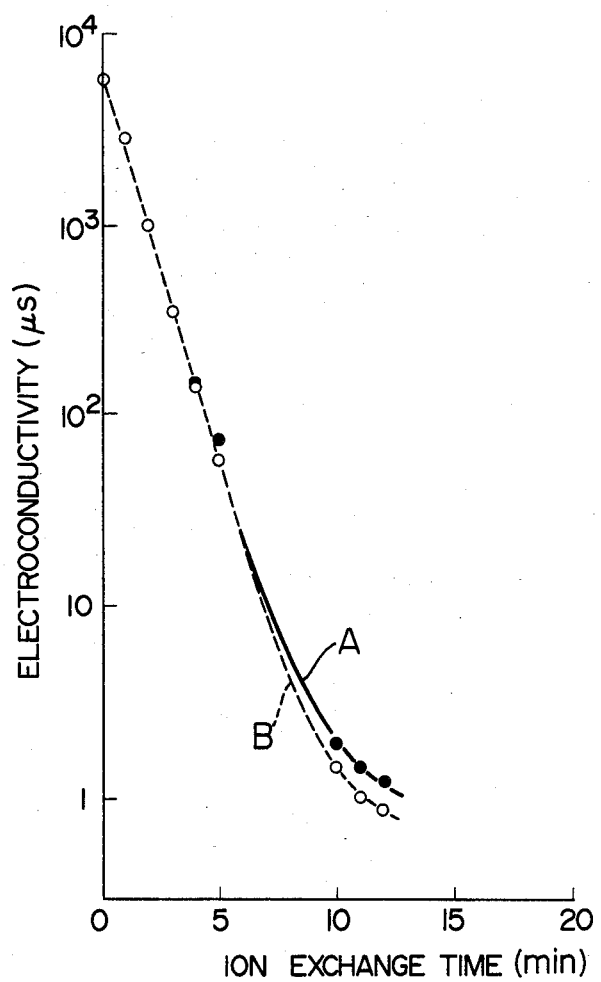

APPARATUS FOR PRODUCING ULTRA-PURE WATER BY ION EXCHANGE RESIN

BACKGROUND OF THE INVENTION

This invention relates to an ion exchange resin insolubilized as to organic components from the resin, a process for preparing the resin and an apparatus for producing ultra-pure water by the resin.

In the semi-conductor industry, the market for LSI (large scale integrated circuit) has been rapidly expanded, and LSI having a higher degree of integration of up to 64K bits is now in the mass production, and attempts to produce LSI on the integration level of 256K bits are now going on and research for LSI on the integration level of 1 M bits, that is, ultra LSI of the next generation is under way. With the progress in LSI-zation, the minimum pattern dimension can be reduced, for example, the minimum pattern dimension of LSI will be 2-3 $\mu$m, and that on the integration level of 1M bits, i.e. VLSI, will be less than 1.5 $\mu$m.

Pure water is used in various washing steps in the process for producing LSI to remove chemicals and fine particles remaining on the wafer surfaces after acid treatment or organic chemical treatment of wafers. Thus, (1) ions, (2) fine particles, (3) microorganisms, (4) organic matters, etc., if contained in the pure water, will have an adverse effect on the oxide film, polycrystalline film, wiring, etc. to be incorporated into the wafers, impairing the electric characteristics and reliability of LSI. The adverse effect will be more serious with increasing integration level, and the requirements for pure water quality will be more stringent. Needless to say, the pure water quality available from the current apparatus for producing pure water cannot meet the requirements for semi-conductors on the integration level of 1-4 M bits.

Furthermore, pure water is required in the medical field, for example, as injection liquid, and also in the nuclear energy field. The adverse effects by typical ones of said adverse factors (1) to (4) on the products in the relevant fields including these medical and nuclear energy fields are summarized in the following Table.

of 64K bits. As to the organic matters themselves, though present in a very small amount, the specific substances contained in the organic matters, for example, Cu, Fe, P, etc. are required to be less than 1 ppb.

In the medical field, the microorganisms produce metabolic products through reaction, thus increasing pyrogens. Consequently, the product purity is lowered and the pyrogenic trouble is brought about. In the nuclear energy field, the organic matters are converted to smaller molecules while forming $COOH^-$ and successively Co complexes, and the capacity for removal of radioactive wastes by ion exchange is lowered. That is, the radioactivity in the nuclear plant facility is increased.

From the foregoing, it can be seen that removal of organic matters from pure water can also reduce the adverse effects by other factors. A permissible concentration of organic matters in pure water for use in the production of semi-conductors on the integration level of 64K bits is now less than 300 ppb in terms of TOC (total organic carbon), whereas the concentration for the integration level of 1 M bits is as stringent as 50 ppb, and thus dissolution of organic matters from ion exchange resin or organic materials of construction used in an apparatus for producing pure water is a problem, which seems to be one of reasons why the current pure water production technique does not meet the requirements for VLSI. Organic matters are present even in the pure water produced according to the process for producing pure water for the integration level of 64K bits even after the multi-stage treatment by means of membrane separators and desalters as the major units, where dissolution of organic matters from the organic materials such as membranes or ion exchange resin used in the major units has been pointed out as a cause for their presence. The desalting treatment using ion exchange resin indispensable for the pure water production has also a problem of discharging of fine ruptured fractions of the resin particles generated by mutual collision of the resin particles or collision of resin particles with the apparatus walls, etc. from the mass of resin particles. Not in the apparatus for producing pure water, but in an apparatus for treating waste water, it is

TABLE

| Field | Phenomena | Problems | | Adverse effects on products | |
|---|---|---|---|---|---|
| Semiconductor | Organic matters $+$ $O^2$ $+$ Microorganisms | 1. Propagation | →Microorganism effluence | Lowering of water purity | →Trouble in performance and decrease in yield |
| Medicine | | | | | |
| Nuclear energy | | 2. Metabolic products | →Pyrogen increase | Lowering of product purity | →Pyrogenic trouble |
| | | 3. Reduction of organic matters to smaller molecules | →$COOH^-$ formation | Lowering of ion exchange capacity | →Increase in radioactivity of nulear plants |

That is, organic matters react with oxygen in the presence of microorganisms to propagate the microorganisms. As a result, the microorganisms are discharged as an effluent in the semi-conductor field, lowering the wafer purity. The maximum particle size must be desirably less than 1/5 of the minimum pattern to prevent occurrence of short circuit. Since the average size of microorganisms is about 1 $\mu$m, the microorganisms themselves are a problem even on the integration level known to regenerate a synthetic adsorbent having ions as adsorbed on the surface by removing the adsorbed ions therefrom by dissolution in a liquefied gas (for example, U.S. Pat. No. 4,061,566). However, said U.S. patent nowhere shows that ion exchange resin is prepared by removing projections from the ion exchange resin.

SUMMARY OF THE INVENTION

An object of the present invention is to provide an ion exchange resin having a high performance, a process for preparing the resin and an apparatus for producing ultra-pure water.

The present inventors have conducted various tests on dissolution of organic matters from ion exchange resin, etc. and on washing of the resulting resin and have found that dissolution of organic matters from ion exchange resin particles, from whose surfaces projections have been removed, can be reduced to 1/10 of that from the ordinary resin particles, and the projections on the resin surface can be removed by contacting the resin with a solvent, particularly a liquefied carbon dioxide gas, or supercritical carbon dioxide gas, and have established the present invention on the basis of these findings.

The projections on the ion exchange resin can be regarded as low strength parts in the ion exchange resin because they can be readily removed. Since the ion exchange resin is fibrous polymers having ion-exchangeable groups incorporated therein, the projections can be called "low strength matrix".

According to the present ion exchange resin, projections are removed from the surfaces of ion exchange resin particles.

According to the present process for preparing an ion exchange resin, ion exchange resin is contacted with a liquefied gas or supercritical gas, whereby the projections can be perfectly removed from the surface of the resin.

According to the present apparatus for producing ultra-pure water by the present ion exchange resin, comprising at least a reverse osmosis unit, an ion exchange resin desalting unit, a sterilizing unit and a ultrafiltration or membrane filtration unit, a system for preparing ion exchange resin through contact with a liquefied gas or supercritical gas is provided in the ion exchange resin desalting unit, and thus removal of ions from pure water can be further promoted to convert pure water to ultra-pure water.

BRIEF DESCRIPTION OF THE DRAWINGS

FIGS. 1 and 2 are diagrams showing performance of ion exchange resin according to one embodiment of the present invention.

PREFERRED EMBODIMENTS OF THE INVENTION

The present invention will be described in detail below, referring to embodiments.

Figure 1:
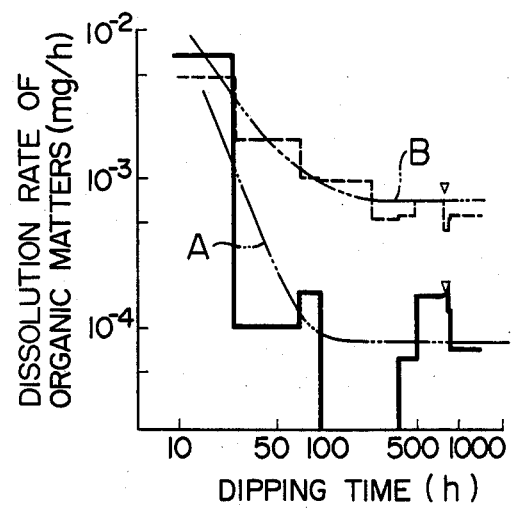

FIG. 1 shows an organic matter-dissolution characteristic of ion exchange resin A according to one embodiment of the present invention, and that of the ordinary ion exchange resin B, that is, the ion exchange resin without the treatment as used in the present invention, where the resin A is the one whose projections have been removed from the resin surface by contacting the resin with a liquefied carbon dioxide gas, whereas resin B has many projections on the resin surface.

In FIG. 1, changes with time in dissolution rate of organic matters in terms of total organic carbon (TOC) are shown when equal volumes of resins A and B are washed with 10-fold volume of distilled water, respectively, and then dipped in 100 ml of distilled water, respectively. TOC dissolution rate is decreased with dipping time and becomes constant, that is, stationary, after a specific time. In FIG. 1, the plotting from the point marked by "∇" rightwards shows the result of continued tests by placing the dipped resins into the same volumes of fresh distilled water, respectively, where no change is observed in the TOC dissolution rate. In other words, the organic matters are continuously dissolved from the resins at the stationary dissolution rate. TOC dissolution rate from resin A according to one embodiment of the present invention is less than 1/10 of that from the ordinary resin B. The organic matter concentration of pure water produced in the current apparatus for producing pure water including a desalting unit using the ordinary ion exchange resin B can be 300 ppb which can satisfy the water quality standard for LSI on the integration level of 64K bits. Thus, it is obvious from the foregoing that the present ion exchange resin can attain the 30 ppb level, which can satisfy the water qality standard for VLSI on the integration level of 1–4 M bits, that is, 50 ppb.

FIG. 2 shows the ion exchange capacity of resin A according to one embodiment of the present invention, where the performance of resin B is also shown by dotted line. That is, FIG. 2 shows changes with time in the electroconductivity of aqueous 0.3 wt. % NaCl solutions when 10 ml of resins A and B are placed therein, respectively. It can be seen therefrom that the resins A and B have substantially equivalent characteristic.

Description has been so far made of the resin from whose surface projections (low strength matrix) have been removed through contact with the liquefied carbon dioxide gas. The present invention is not limited thereto. Any resin can be used, so long as the projections on the surface have been removed through contact with other ordinary liquefied gases, supercritical gases or organic solvents. Sometimes, the projections as removed may remain on the resin surface as attached, and thus washing of the resin with a high density fluid, for example, water, is desirable after the contact of the resin with a liquefied gas, etc. Thus, it is possible to use a mechanical operation such as ultrasonic application, etc. at the same time when the projections are to be removed from the resin.

A solvent that can undergo exchange reaction with the ion-exchanging group of the resin is not preferable as the solvent. For example, such a solvent is not preferable which can dissolve a carbon dioxide gas into the water contained in an anion exchange resin to form carbonate ions capable of undergoing ion exchange reaction with the ion exchanging groups of the resin when the anion exchange resin is prepared by the liquefied carbon dioxide gas, though it can remove the projections from the resin surface, since the ion exchange capacity of the resin proper is lowered thereby. In that case, the ion exchanging capacity can be maintained (1) by applying a degasification treatment by pH controlling, etc. to the resin after said treatment or (2) by contacting the resin in Na-form or Cl-form with the liquefied gas, etc.

Generally, liquefied gas or supercritical gas is in a high pressure, and thus is used in such a high pressure state for contact with the resin. After the contacting, the pressure of the resin is reduced to the atmospheric pressure. Belching of the gas from the resin resulting from the pressure reduction is effective for removing the matrices attached to the resin surface, but the abrupt pressure reduction leads to development of cracks in the resin and considerable reduction in compression strength. Consequently, generation of fine ruptured fraction from the mass of resin particles is increased. Thus, it is necessary to conduct the pressure reduction at an appropriate rate.

Figure 3:
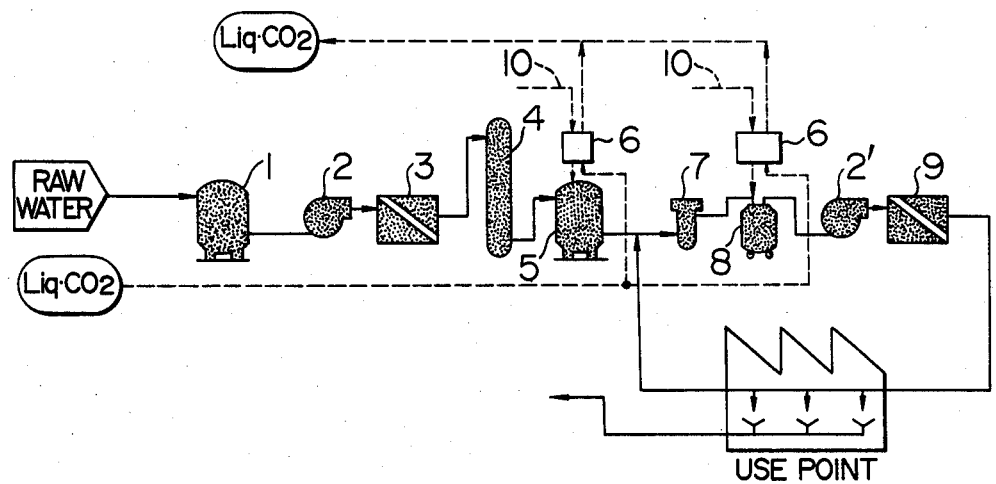
FIG. 3 is a flow diagram of an apparatus for producing ultra-pure water according to the present invention.

FIG. 3 shows a flow diagram of an apparatus for producing ultra-pure water according to one embodiment of the present invention, which includes a pure water production system shown by a full line and a liquefied carbon dioxide preparation system shown by a dotted line. The pure water production system comprises a filter 1, pumps 2 and 2', a reverse osmosis unit 3, a degasifying unit 4, a desalting unit 5, a sterilizing unit 7, a polisher 8, a MF (membrane filtation) or UF (ultra-filtration) unit 9, etc. each having an inlet and an outlet and being in fluid communication as shown by the full line. The liquefied carbon dioxide gas preparation system comprises a liquefied carbon dioxide line shown by a dotted line, ion exchange resin preparation units 6, etc.

Usually, a pressure of 50-70 atmospheres is required for producing a liquefied carbon dioxide gas at room temperature, and thus a structure or materials of construction capable of withstanding said pressure is used for the liquefied carbon dioxide gas line and the ion exchange resin preparation units 6.

Ion exchange resin 10 for filling the desalting unit 5 and the polisher 8 is prepared by contacting the resin 10 with a liquefied carbon dioxide gas in advance in the ion exchange resin preparation units 6 and then filled in the desalting unit 5 and the polisher 8, or sometimes filled therein after washing the resin with water. The liquefied carbon dioxide gas containing unpolymerized organic matters in the resin, etc. as dissolved therein through contact with the ion exchange resin is withdrawn from the liquefied carbon dioxide gas preparation system and then gasified. Sometimes, it can be used as a recycle.

After the ion exchange resin prepared through the contact with the liquefied carbon dioxide gas has been filled in the desalting unit 5 and the polisher 8, raw water is introduced into the pure water production system to obtain ultra-pure water.

In the pure water production system, the raw water is at first filtered to remove relatively large suspended solid matters, and then subjected to reverse osmosis treatment to remove medium-sized, suspended solid matters and, to some degree, ions. In the degasifying unit 4, the water is particularly deoxygenated to remove oxygen as a factor for the reaction between the oxygen and organic matters in the presence of microorganisms. Then, the water is freed from the remaining ions in the desalting unit 5. Generally, pure water obtained by the treatments up to the desalting unit 5 is called "primary pure water". The primary pure water is then passed through the sterilizing unit 7 and the polisher 8 to remove a very small amount of metal ions therefrom and then through the MF or UF unit 9 to remove the residual suspended solid matters therefrom, whereby "secondary pure water" can be obtained. The secondary pure water has the water quality of ultra-pure water. That is, the water quality is 30 ppb of TOC, which can satisfy the requirements for VLSI. The thus obtained ultra-pure water can be used for washing semi-conductors, etc.

According to the present invention, (1) dissolution of organic matters from the resin, etc. into pure water can be practically prevented, and ultra-pure water free from the organic matters as a source of troubles in the production of ultra-pure water can be obtained, as described above; (2) desorption of organic matters adsorbed on the ion exchange resin from the outside can be effected; (3) the present ion exchange resin has uniform strength all over the resin surface because the projections (low strength matrix) are removed from the resin surface, and thus there is no rupture of resin due to mutual collision of resin particles or collision between the resin particles and the apparatus walls when the resin is filled in the desalting unit or the polisher, as observed in the case of the ordinary ion exchange resin. That is, generation of fine particles (fine ruptured fractions of the resin) from the mass of resin particles can be prevented, and the trouble pertaining to the fine particles among said 4 adverse factors in the production of ultra-pure water can be also considerably improved.

As a result, the reliability of the products and increase in yield can be attained in the production of LSI on the current integration level, and mass production of VLSI of the next generation can be expected.

In the foregoing embodiment of the present invention, description has been made of filling the resin treated in the ion exchange resin preparation units 6 into the desalting unit 5 and the polisher 8. It is also possible to contact the resin with the liquefied carbon dioxide gas in the desalting unit 5 and the polisher 8 by making them in a pressure-resistant structure, where said effect (3) can be further increased.

It is also possible to prepare the resin by a supercritical carbon dioxide gas in place of the liquefied carbon dioxide gas, but a temperature control system must be provided in that case. Carbon dioxide gas has the critical temperature of about 31° C. and the critical pressure of about 73 atmospheres. Thus, the maximum temperature of liquefied carbon dioxide gas is 31° C., which is lower than the temperature at which the performance of ion exchange resin is deteriorated. That is, temperature control is not required so long as the operation is not carried out below 0° C. On the other hand, a supercritical carbon dioxide gas has a higher temperature than 31° C., and thus the temperature control is required to keep the temperature within such a temperature range as not to deteriorate the performance of the resin. The pressure of a supercritical carbon dioxide gas is about 73 atmospheres or higher.

Not only a carbon dioxide gas, but also other liquefied gas or supercritical gas, for example, organic solvents such as hydrocarbons or halogenated hydrocarbons can be utilized in the present invention, so long as they can satisfy the requirements for (1) temperature, (2) pressure, and (3) influences on pure water after gasification, (particularly dissolution in pure water).

Supercritical gas refers to a gas at a temperature above the critical temperature and a pressure above the critical pressure in the pressure-temperature phase diagram. Liquefied gas refers to the one which is at a pressure above the vapor pressure curve in the pressure-temperature phase diagram and which is in a gaseous state at room temperature and the atmospheric pressure.

In the foregoing, description has been made of the ion exchange resin, but dissolution of organic matters from separator membranes made of organic materials such as ion exchange membrane, reverse osmosis membrane, UF membrane, MF membrane, etc. takes place more or less, and thus the present invention is also applicable to their treatment.

What is claimed is:

1. An apparatus for producing ultra-pure water which comprises an ion exchange resin desalting unit having an inlet for receiving raw water and an outlet and containing an ion exchange resin having surfaces from which projections of resin have been removed, a sterilizing unit having an inlet in fluid communication with said outlet of said desalting unit and having an outlet, an ultrafiltration or membrane filtration unit having an inlet in fluid communication with said outlet of said sterilizing unit and having an outlet for ultra-pure water, and an ion exchange resin preparation unit for preparing said ion exchange resin prior to introduction into said ion exchange resin desalting unit, said ion exchange resin preparation unit comprising means for contacting an ion exchange resin having projections of resin on its surfaces with a high pressure gas to remove said projections and means for transferring said ion exchange resin having surfaces from which projections of resin have been removed to said desalting unit.

2. An apparatus according to claim 1, wherein the gas is a liquified carbon dioxide gas.

3. An apparatus according to claim 6, wherein the gas is a supercritical carbon dioxide gas.

4. An apparatus according to claim 1, further comprising means for washing the ion exchange resin with a high density fluid after contacting the ion exchange resin with the gas.

5. An apparatus according to claim 1, further comprising means for ultrasonically vibrating the ion exchange resin after contacting the ion exchange resin with the gas.

6. An apparatus for producing ultra-pure water, which comprises means for removing suspended solid matters from raw water having an inlet for raw water and an outlet, means for removing ions by an ion exchange resin from the water freed from the suspended solid matters having an inlet in fluid communication with said outlet of said means for removing suspended solid matters from raw water and an outlet, the ion exchange resin having surfaces from which projections of resin have been removed and an ion exchange resin preparation unit comprising means for contacting an ion exchange resin having projections of resin on its surfaces with a high pressure gas to remove said projections from the surfaces of the ion exchange resin and means for supplying the ion exchange resin having surfaces from which projections of resin have been removed to said means for removng ions.

7. An apparatus according to claim 6, further comprising means for discharging the high pressure gas containing the projections removed from the ion exchange resin and dissolved therein from the ion exchange resin preparation unit.

8. An apparatus for producing ultra-pure water which comprises:
a filter for filtering raw water, thereby removing suspended solid matters from the raw water, said filter having an inlet for raw water and an outlet;
a desalting unit for removing ions from the water treated in the filter, thereby producing primary pure water, said desalting unit having an inlet in fluid communication with said outlet of said filter and an outlet;
a polisher for further removing ions from the primary pure water obtained in the desalting unit, thereby producing secondary pure water, said polisher having an inlet in fluid communication with said outlet of said desalting unit and an outlet for secondary pure water;
an ion exchange resin preparation unit comprising means for contacting an ion exchange resin having projections of resin on its surfaces with a high pressure gas to remove the projections from the surfaces to form an ion exchange resin having surfaces from which said projections of resin have been removed; and
means for supplying the ion exchange resin having surfaces from which projections of resin have been removed to the desalting unit and the polisher; the secondary pure water having the quality of ultra-pure water.

9. An apparatus according to claim 8, wherein a reverse osmosis unit for removing ions from the raw water and a degasifying unit for removing oxygen from the raw water are provided between and fluidly connected to the filter and the desalting unit.

10. An apparatus according to claim 8, wherein a sterilizing unit for sterilizing the primary pure water is provided between and fluidly connected to the desalting unit and the polisher.

11. An apparatus according to claim 8, wherein a membrane filtration unit or an ultrafiltration unit for removing residual suspended solid matters from the pure water treated in the polisher is further provided and has an inlet in fluid communication with the outlet for secondary pure water and an outlet for ultra-pure water.

12. An apparatus according to claim 1, wherein the said ion exchange resin preparation unit further comprises means for reducing the pressure of the high pressure gas retained in the ion exchange resin after the ion exchange resin has been contacted with the gas.

13. An apparatus according to claim 1, 6, 7, 8, 9, 10, 11 or 12, wherein the gas is a liquefied gas.

14. An apparatus according to claim 1, 6, 7, 8, 9, 10, 11 or 12, wherein the gas is a supercritical gas.

* * * * *